US006842515B2

(12) United States Patent
Mengshoel et al.

(10) Patent No.: US 6,842,515 B2
(45) Date of Patent: Jan. 11, 2005

(54) MULTI-SITE RESPONSIBILITY-BASED ROUTING

(75) Inventors: Ole J. Mengshoel, Newport Beach, CA (US); Ken Fertig, Palo Alto, CA (US); Kurt Sunderman, West Chicago, IL (US); Anthony Dezonno, Bloomingdale, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 578 days.

(21) Appl. No.: 09/879,423

(22) Filed: Jun. 12, 2001

(65) Prior Publication Data

US 2003/0059029 A1 Mar. 27, 2003

(51) Int. Cl.[7] .............................................. H04M 7/00
(52) U.S. Cl. .......................... 379/265.02; 379/265.05; 379/265.11; 379/265.13
(58) Field of Search .................. 379/265.01–265.1, 379/266.01–266.1, 309

(56) References Cited

U.S. PATENT DOCUMENTS

| | | | | |
|---|---|---|---|---|
| 4,953,204 A | * | 8/1990 | Cuschleg et al. ...... 379/266.05 |
| 5,291,552 A | * | 3/1994 | Kerrigan et al. ....... 379/266.04 |
| 5,828,747 A | * | 10/1998 | Fisher et al. ................. 379/309 |
| 5,937,051 A | * | 8/1999 | Hurd et al. ............. 379/212.01 |
| 6,553,113 B1 | * | 4/2003 | Dhir et al. ............. 379/265.02 |
| 6,633,640 B1 | * | 10/2003 | Cohen et al. .......... 379/265.03 |

FOREIGN PATENT DOCUMENTS

| EP | 1 056 264 | * 11/2000 | .......... H04M/3/352 |

* cited by examiner

*Primary Examiner*—William J. Deane, Jr.
(74) *Attorney, Agent, or Firm*—Welsh & Katz, Ltd.

(57) ABSTRACT

A method and apparatus are provided for distributing calls in an automatic call distribution system having one or more master sites, a plurality of satellite sites and at least some agents located at each satellite site of the plurality of satellite sites. The method includes the steps of detecting a call at a master site of the automatic call distribution system, determining a call type of the call, and contemporaneously measuring a deviation from a target occupancy in handling calls of the determined call type for each agent of the at least some agents located at each satellite site. The method further includes the steps of identifying an agent with a largest relative under-utilization or the least relative over-utilization based upon the measured deviation and transferring the call from the master site to a satellite site of the plurality of satellite site where the identified agent is located.

24 Claims, 2 Drawing Sheets

MULTI-SITE RESPONSIBILITY-BASED ROUTING

FIELD OF THE INVENTION

The field of the invention relates to telephony systems and more particularly to automatic call distributors.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In order to staff an ACD, an organization often relies on historical levels (in Erlangs) of incoming calls to the individual call targets. A manager of the ACD may examine the historical call loading records, add or subtract a percentage of the historical loading based upon a most recent call history (e.g., the most recent week or month), and estimate a staffing level based upon those calculations. Alternatively, some organizations have relied upon commercially available predictive software (i.e., force management packages) that calculates daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group may be separately staffed based upon an Erlang estimate for that group.

As an alternative to staffing individual groups, some systems group all agents together and assign a skill rating to each agent. Calls are then assigned based upon the skill rating of the agent for handling that type of call.

For example, where a single group is used, an ACD will always look for and assign the call to the most qualified agent. However, some agents are more qualified than others. Because of the differences in qualifications, some agents receive more calls than others, resulting in an inequitable work load.

Further, where all agents are grouped together, an Erlang rate for any one group becomes irrelevant. For example, one benefit of using a common group relates to economies of scale. Two separate groups that separately require 10 agents each would typically only require 18 agents from a common pool of agents. On the other hand, some systems share some agents and, therefore, there is some economies due to the sharing, however, neither extreme is typically used exclusively.

Further, because of sharing it is difficult, if not impossible for call center management to know how many agents are serving a particular application. Because of the difficulty of determining agent loading, it is also difficult to project staffing requirements in a shared agent environment.

Further, the balancing of calls arriving in a multi-site call center environment can be a difficult problem to solve. One way to handle this problem is to distribute calls that arrive in a round-robin fashion among the call centers. The problem with this approach is that it does not consider local loading and, as a consequence that which is locally optimal may not be globally optimal. For example, suppose that call center O is over-utilized in terms of agents with skills $S_1 \ldots S_K$, while at call center U, agents with those skills are under-utilized. The naive round-robin approach would route a call requiring skills $S_1 \ldots S_K$, to O or U with equal probability, while clearly it would be much better to route that call to call center U.

In general, in contact centers, including call centers, it is difficult to allocate resources, including personnel resources, such that the goals of the contact center business (e.g., average speed of answer, service level, level of abandoned calls, etc.) are met. Where all agents are grouped together, staffing estimates can be based upon an Erlang rate of the agent pool as a whole. Basing a staffing estimate upon an organization as a whole is subject to large errors, if the agents are not, in fact, grouped together. Because of the importance of call handling through ACDs and the need to route agents according to skill, a need exists for a method of assigning agents which is more flexible than the individual group method.

SUMMARY

A method and apparatus are provided for distributing calls in an automatic call distribution system having one or more master sites, a plurality of satellite sites and at least some agents located at each satellite site of the plurality of satellite sites. The method includes the steps of detecting a call at a master site of the automatic call distribution system, determining a call type of the call, and contemporaneously measuring a deviation from a target occupancy in handling calls of the determined call type for each agent of the at least some agents located at each satellite site. The method further includes the steps of identifying an agent with a largest relative under-utilization or the smallest relative over-utilization based upon the measured deviation and transferring the call from the master site to a satellite site of the plurality of satellite site where the identified agent is located.

DETAILED DESCRIPTION OF A PREFERRED EMBODIMENT

Figure 1:
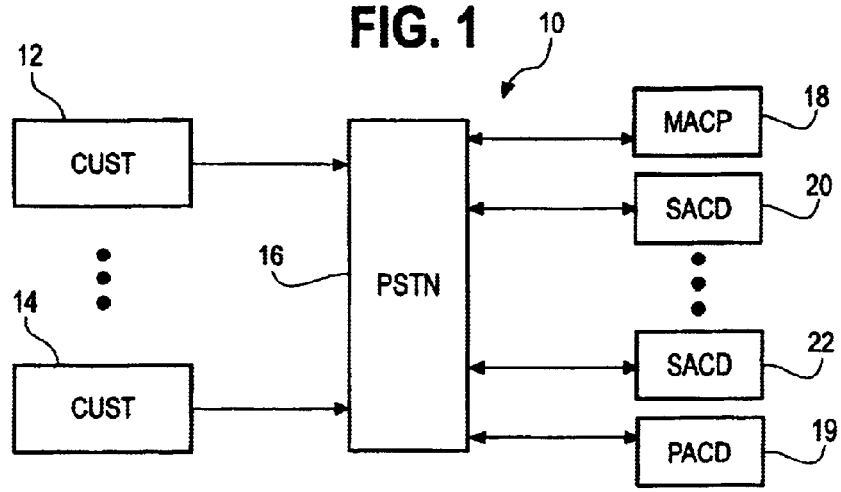
FIG. 1 is a block diagram of an ACD system in accordance with an illustrated embodiment of the invention.

FIG. 1 is a block diagram of a ACD system 10, shown generally in a context of use and in accordance with an illustrated embodiment of the invention. Under the illustrated embodiment, an ACD owner or user (not shown) may disseminate a telephone number of a master ACD (MACD) 18. Calls originated by the customers 12, 14 based upon the disseminated number may be received and processed by the MACD 18. Alternatively, calls may be placed from the MACD 18 to customers 12, 14.

In either case, calls (either received by a originated from the MACD 18) may be detected, processed by the MACD 18 and distributed to satellite ACDs (SACDs) 20, 22. It is contemplated that the MACD 18 would handle a mix of inbound and outbound calls. In this context, processing of a calls by the MACD 18 means determining a call type of the call, identifying a skill required for handling the call and transferring the call to a SACD 20, 22 having an agent qualified to handle the call.

It should be noted that while the MACD 18 has been designated as being the master, other ACDs could also share that responsibility. Other ACDs 19 sharing the responsibility for routing calls to SACDs 20, 22 will be referred to as peer ACDs (PACDs) 19. While only one PACD 19 is shown in FIG. 1, it is to be understood that SACDs 20, 22 could also function as a PACD in situations described below.

Figure 2:
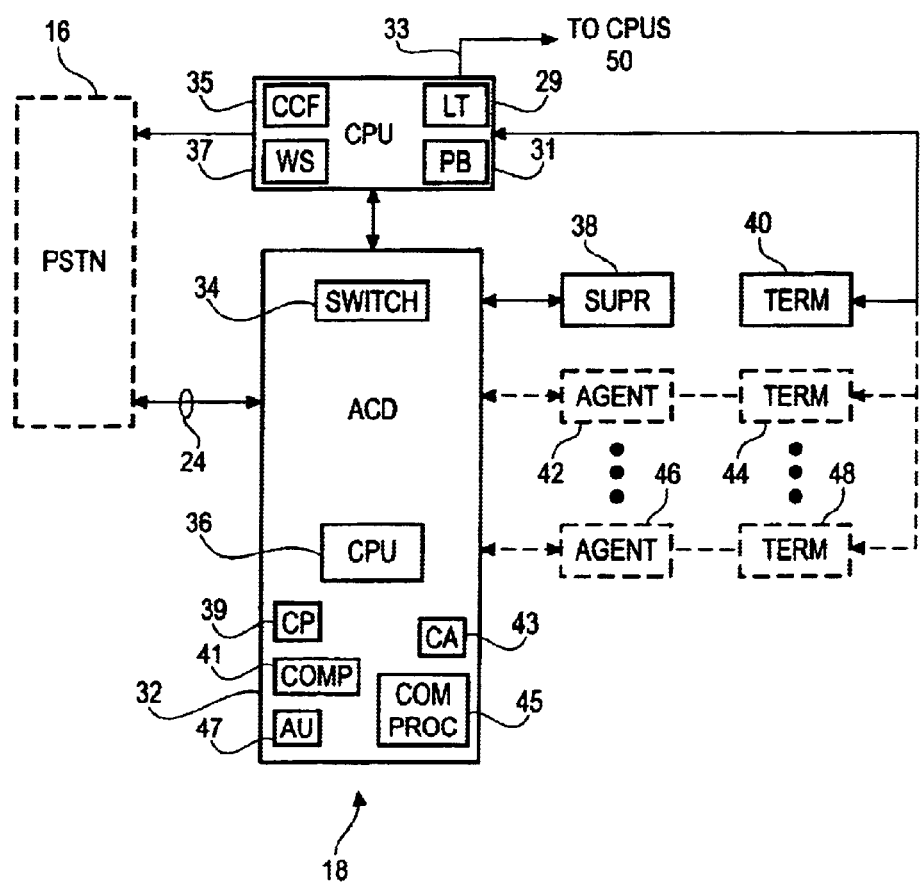
FIG. 2 is a block diagram of a master ACD of the system of FIG. 1.
Figure 3:
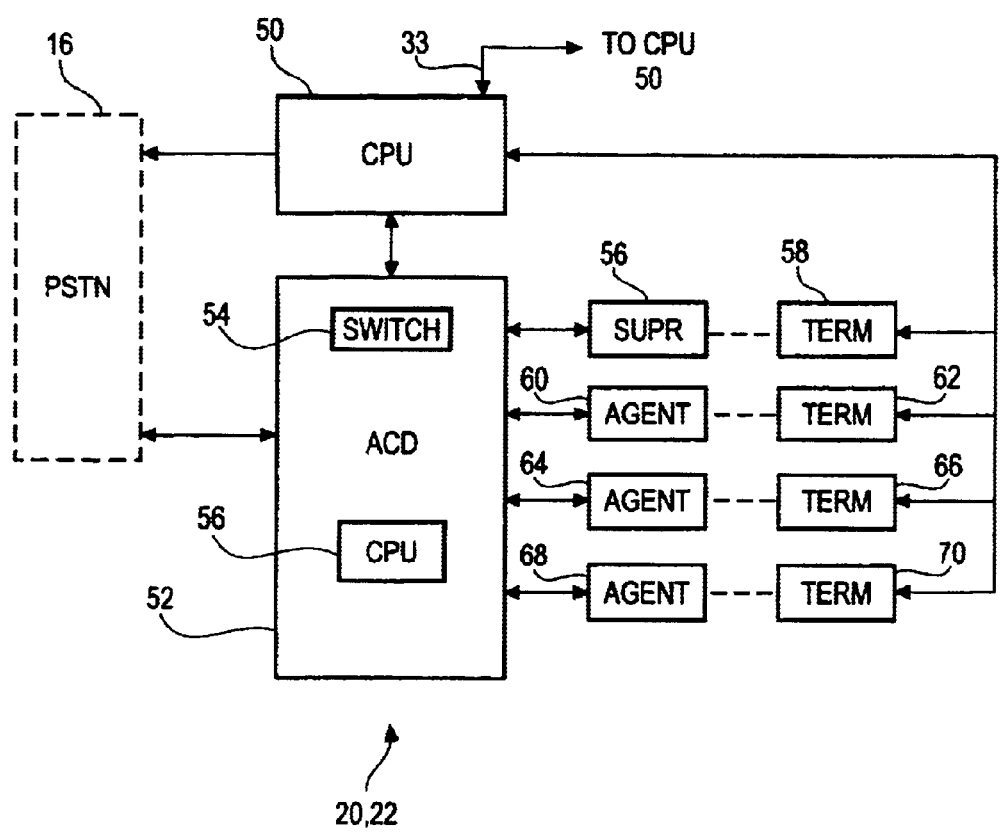
FIG. 3 is a block diagram of a satellite ACD of the system of FIG. 1.

FIG. 2 is a block diagram of the MACD 18 and FIG. 3 is a block diagram of the SACDs 20, 22. While the MACD 18 and SACDs 20, 22 may be similar in appearance, they may function in a fundamentally different manner depending upon the call processing context.

For example, the MACD 18 may form the primary contact point in processing incoming or outgoing calls. Further, the MACD 18 (while shown as having agents in FIG. 2) may, in fact, have no agents and function simply as a contact processor. Reference shall be made to FIGS. 2 and 3 as appropriate to understanding the invention.

Under the illustrated embodiment, the MACD 18 may receive calls through a number of trunk lines 24 from customers 12, 14 of the MACD 18. Along with the calls, the MACD 18 may receive information (i.e., call associated data) about the calls from the PSTN 16. For example, the MACD 18 may receive an identifier of a caller from an automatic number identification (ANI) service operating from within the PSTN 16. The MACD 18 may also receive information about a dialed number through a dialed number identification (DNIS) service or direct inward dial (DID) information from the PSTN 16.

The MACD 18 may also be programmed to place calls at the same time as it receives calls. For example, the MACD 18 may conduct an outgoing call campaign to existing or potential customers at the same time as it receives calls from existing or potential customers.

In the case of outgoing calls, a list of telephone numbers (i.e., of call targets) may be retrieved from a database 31 or entered through a supervisor's terminal 40 and transferred to the CPU 30. The list may be sequentially transferred to the ACD 32 for processing. Upon receipt of a telephone number of a call target, the ACD 32 may seize a trunk line of the trunks 24 and transfer the target telephone number to the PSTN 16. When the target answers, the ACD 32 may connect the target to an agent locally if the MACD 18 has agents or transfer the call to a SACD 20, 22.

Where the call was initiated by the MACD 18, the CPU 30 associated with the MACD 18 may classify the call type based upon the subject matter and purpose of the call. Classifying the call according to call type allows the CPU 30 to identify and assign the appropriate resources to servicing the call. It is to be understood that classifying outbound calls would be easier than classifying inbound calls because the system 10 has more information about the reasons for the call.

In contrast, incoming calls may be classified based upon the receipt of call associated information. The identity of the caller or call destination allows the MACD 18 to draw certain inferences about the purpose of the call and the best resource to use in handling the call.

From the information received from the PSTN 16 (or from the CPU 30 in the case of outgoing calls), the MACD 18 may classify the call as a particular work type based upon the identity of the call target and whether it is an inbound or outbound call. For example, the ACD system 10 may be owned and operated by a department store. Individual call destinations may include women's clothing, men's clothing, footwear, housewares, appliances, electronics, furniture, hardware, automotive and garden. Other internal call targets may include catalog sales or technical support for one or more of the other call targets.

As opposed to creating semi-permanent groups of agents and queuing calls to the appropriate group, the MACD 18 places agents in a single pool and directs all calls to this pool. Note that this pool is a composite of all agents at the SACDs 20, 22 and MACD 18 (if any).

Alternatively, agents may be grouped into clusters. A cluster differs from a group in that an agent may be assigned to only one cluster.

Agents are rated according to skill level in each call type. A respective target agent responsibility (occupancy) matrix may be created at each MACD 18 and PACD 19 to allocate portions of agents' time to each call type. As used herein a target occupancy means the percentage of time that an agent is assigned to handling a particular call type. A target occupancy matrix means the correlated percentages of the assignments of many agents.

One factor that may be used to control agent inclusion in the occupancies described herein is availability. For example, before an agent signs-in at a beginning of his shift, he would not appear in the target occupancy. Likewise, when an agent is occupied be another call, he could not receive another call and, therefore, similarly not appear in the difference occupancy described below.

Allocation of agents' time may be based upon the agent skill in handling that call type, as well as upon call type workload and other enterprise-related factors. Table I is a simplified example of a target occupancy matrix.

TABLE I

|  | Tocc (j) | WORK TYPE #1 | WORK TYPE #2 | WORK TYPE #3 |
|---|---|---|---|---|
| AGENT #1 | 85% | 10% | 60% | 15% |
| AGENT #2 | 50% | 20% | 20% | 10% |
| AGENT #3 | 90% | 30% | 30% | 30% |
| AGENT #4 | 90% | 70% | 10% | 10% |

In the over-staffed situation (agents available when a call arrives), the call is handled by the agent who is the most under-utilized or the least over-utilized. Both under-utilization and over-utilization is based on the notion of actual occupancy. Actual occupancy may be defined as a weighted time average of the amount of time an agent has worked on a particular work type, with the weight being greater the more recent the activity. For example, an exponentially weighted average over a period (T) would be:

$$AOcc_j(t) = 100 \int_0^T \frac{e^{-a\tau}}{1 - e^{aT}} U_j(t - \tau) d\tau,$$

where $U_j(s)$ has a value of one if the agent is busy on work type j at time s and zero otherwise.

Table II is an example of an actual occupancy matrix.

TABLE II

|  | Aocc (j) | WORK TYPE #1 | WORK TYPE #2 | WORK TYPE #3 |
|---|---|---|---|---|
| AGENT #1 | 74% | 10% | 50% | 15% |
| AGENT #2 | 49% | 19% | 20% | 10% |
| AGENT #3 | 82% | 27% | 30% | 25% |
| AGENT #4 | 71% | 50% | 10% | 11% |

Where a call comes in (e.g., for work type #1) a comparison is made of the deviation of each agent from the target occupancy for that work type. Table III depicts the deviation between Tocc(j) and Aocc(j) for each work type.

TABLE III

|  | Docc (j) | WORK TYPE #1 | WORK TYPE #2 | WORK TYPE #3 |
|---|---|---|---|---|
| AGENT #1 | −10% | 0% | −10% | 0% |
| AGENT #2 | −1% | −1% | 0% | 0% |
| AGENT #3 | −8% | −3% | 0% | −5% |
| AGENT #4 | −19% | −20% | 0% | +1% |

As may be seen by comparing Tables I and II, agent #4 has a target occupancy for work type #1 of 70% and an actual occupancy for work type #1 of 50%. Since agent #4 has the greatest negative deviation (i.e., is the most under-utilized), as shown in Table III, the next call of work type #1 would go to agent #4.

It may be noted in passing that the Docc(j) need not all be negative numbers. For example, agent #4 shows a Docc(j) for work type #3 of +1%. Positive numbers in this context may be taken to mean an overload (e.g., a number of calls per time period) of the call type for which a particular agent (e.g., #4) is particularly well suited.

In the understaffed situation (no agents available and calls are queued), a call will be selected (when an agent becomes available) under a number of different methods. For example, under a first method, the call that has been in a queue the longest may be selected for assignment to an agent who becomes available. Alternatively, the next call may be selected from the queue of a work type that will bring an available agent's actual occupancy level closest to the target for that agent. If there is more than one call of that work type, then the call with the highest priority or the longest time in queue may be chosen.

Alternatively, some combination of time and Docc(j) may be used. For example, if no call has been in a queue for more than 30 seconds then Docc(j) may be used for call selection. If any one or more calls has been in a queue more than 30 seconds, then the call waiting the longest may be selected for assignment to the agent.

The system may be used to provide real-time reporting in the form of a display of actual versus target agent occupancy for each call type, and provides a mechanism for adjusting the target occupancies of individual agents through the user station. This solution has the advantage that it gives call center management, working through the terminal 40 (hereinafter referred to as the "user"), a mechanism for easy control over agent assignments in the form of target occupancies, and it provides a predictable agent utilization where desired.

Under the illustrated embodiment, each agent is evaluated and assigned a skill level for his proficiency in any number of skills related to servicing calls directed to each particular type of call. An agent may be assigned a skill level expressed as any number between 0 and 10 (i.e., where 10 indicates the highest level of proficiency), in increments of 1. Table IV is an example of a skills matrix that may be used to classify agents.

TABLE IV

|  | ENGLISH | SPANISH | WOMENS CLOTHING | MENS CLOTHING | FOOTWEAR |
|---|---|---|---|---|---|
| AGENT #1 | 1 | 0 | 5 | 9 | 3 |
| AGENT #2 | 9 | 3 | 5 | 1 | 8 |
| AGENT #3 | 5 | 5 | 7 | 2 | 0 |

Agent proficiency may be regarded as one example of semi-permanent data that may be used by the CPU 30, 50 to create a target occupancy matrix. Permanent and variable data may also be used.

Permanent data may include a list of skill types required for each work type. A list may also be provided of the work types handled by the system 10. A minimum skill level may be included for each skill required for each work type. A priority number may be provided for each work type.

Variable data may include a target total agent occupancy (Tocc(i)) for each agent i (also referred to below as Total Target Occupancy). For example, an agent may have a target total agent occupancy of 85, 95 or even 100%. Further, the variable data may include one or more target agent occupancies for the particular work types.

Variable data may also include an expected call load for each work type. The expected load may be in arrival rates and service time, the latter perhaps being agent specific. The variable data may also include a list of agents scheduled to work during any time period.

Once the permanent, semi-permanent and variable data have been provided, the CPU 30, 50 may form an initial target occupancy matrix. In forming the initial target matrix, the CPU 30, 50 must determine whether an agent is qualified to be given an occupancy value for any particular work type within the target matrix.

To determine the suitability of an agent for a work type, the CPU 30, 50 may evaluate each agent's qualifications with regard to the work type. Each agent i must possess a skill level that exceeds a minimum level required by the work type. In effect, the skill ASkl(i,k) of agent i for skill k must exceed the skill requirement WSkl(j,k) for work type j in skill k. Further, any particular work type may require a skill set including more than one evaluated skill. Stated differently, for an agent to be assigned to a work type, ASkl(i,k)≧WSkl(j,k) for all k.

In the example of Table II, a call from/to a particular geographic area may be known to include a large Spanish population. Calls to a telephone number associated with this area regarding footwear would require at least two skills (i.e., the ability to speak Spanish as well as a knowledge of footwear). A minimum skill level may be required in each skill.

To evaluate an agent for a work type where multiple skills are required, the CPU 30, 50 may use a distance measure ACap(i,j) between the agent i's skills and work type j's requirements. Where ACap(i,j)≧0, the agent may be regarded as qualified for the work type. Where ACap(i,j)<0, the agent may not be regarded as qualified for the work type.

The task of the CPU 30, 50 is to determine a target occupancy matrix that maximizes the skill match between agent skills and work type needs, while at the same time assigning sufficient resources to each work type and supporting the minimal skill requirements for each work type. One approach for doing this would be to solve the constrained optimization problem using integer programming techniques. The formal optimization problem is presented below.

Optimization Problem P1:

Given weight factor f, find target occupancy matrix T to minimize $\phi(T)=fM_s(T)+(1-f)M_D(T)$, subject to $$C1: \sum_{j=1}^{J} T_{ij} = \rho_i, i = 1 \ldots I$$

$$C2: \sum_{i=1}^{I} T_{ij} = W_j, i = 1 \ldots I, \text{ and}$$

$$C3: 0 \leq T_{ij} \leq C_{ij}, i = 1 \ldots I, j = 1 \ldots J.$$

Here $M_s$ is a metric that measures the benefits of a good skill assignment, and $M_D$ measures the reduction in queues due to sharing workload among many agents. The contact center manager can choose the factor, f, to trade off these perhaps competing needs. The next subsection describes these metrics in more detail.

Another way to solve the problem of developing the target occupancy matrix, T, is to use an iterative repair strategy. This approach is elaborated upon below.

Once the capability of each agent is determined, the CPU 30, 50 may form an initial target matrix. To populate the matrix, the CPU 30, 50 may first retrieve a set of occupancy values entered by the user. For example, the user may enter a total occupancy Tocc(i) for a particular agent i over all work types. The user may also enter an occupancy value ("X(i,j)") for the agent i regarding one or more work types j. Ultimately, the user could specify the entire initial target matrix, but this is not necessary since the CPU 30, 50 will supply occupancy values where necessary.

The CPU 30, 50 may first determine the number of effective agents available by summing the Tocc(i) values for the agents scheduled to work for any particular time period. For example, if two agents were available and each had a Tocc(i)=50%, then the number of effective agents in this case would be one. The number of effective agents for the system 10 may be determined by solving the equation as follows:

$$effectiveAgents = \sum_{i=1}^{numOfAgents} Tocc(i).$$

A residual staffing level ("residualStaffing") may be determined by subtracting the sum of the predicted workload of each work type ("prdtworkload(j)") from the number of effective agents as follows:

$$residualStaffing = effectiveAgents - \sum_{j=1}^{numOfWorkTypes} prdtworkload(j).$$

If there are more effective agents than the sum of predicted workloads, then extra agents may be distributed among the work types based upon loads and staffing priorities. If there are fewer effective agents than the sum of predicted workloads, then each work type may be assigned fewer agents than is suggested by its workload. The number fewer is dependent upon the work loads and priorities ("relativepriority"). In either case, a target number of effective agents for each work type ("TargetFTE(j)") may be determined as follows:

$$perPortion = \frac{residualStaffing}{\sum_{j=1}^{numOfWorkTypes} (relativepriority(j))(prdtworkload(j))}, \text{ and}$$

$$TargetFTE(j) =$$
$$(perPortion)(relativePriority(j))(prdtworkload(j)) + prdtworkload(j).$$

To populate the initial target matrix, the CPU 30, 50 sequentially selects agents and randomly selects work types. The occupancy X(i,j) given agent i to work type j may also be random or may be a percent of total time or a fixed value, so long as the sum of all occupancies for the agent is less than a user specified Tocc(i) or 100%.

Tocc(i) may be set by the user at anywhere from zero to 100%. If not specified by the user, the Tocc(i) for an agent will have a default value of 100%. If Tocc(i) is set by the user, the CPU 30, 50 will not change it. Similarly, if the user selects a work type occupancy X(i,j) for an agent, the CPU 30, 50 will not change it.

It should be kept in mind that while the CPU 30, 50 may randomly select work types, any selected work type will be skipped if an agent is not skilled for that work type (i.e., ACap(i,j)<0). The CPU 30, 50 may then randomly select another work type. The CPU 30, 50 may also check that the occupancy does not exceed a maximum number of work types allowed per agent ("MaxNumWtPerAgent"). If it does reach a maximum number for an agent, the CPU 30, 50 may go on to the next agent.

For instance, where a Tocc(i) for an agent is manually selected by the user at 80%, there are four work types, and the agent is skilled to work in each work type, then the CPU 30, 50 may assign an occupancy of 20% to each work type. If based upon the agent capability Acap(i,j), the agent is not qualified for the first work type, then the CPU 30, 50 may assign work type occupancy values of 30% to the second and third work type and 20% to the last work type.

In general, the CPU 30, 50 may repetitively assign work types X(i,j) until each agents' Tocc(i) is reached. Preferably, the CPU 30, 50 uses small values (i.e., fractional occupancies) of X(i,j) to maximize the number of work types ("numOfAssignedWts(i)").

To ensure that each agent gains experience in other work types, a minimum number of work types ("MinNumWTPerAgent") may also be specified. Where the threshold value for a minimum number of work types per agent ("MinNumWTPerAgent") is not met, the CPU 30, 50 may divide up one or more of the agent's occupancies among other work types to achieve the threshold value.

Once an initial target matrix is achieved, the CPU 30, 50 may compute a number of assigned equivalent full time agents for each work type ("assignedFTE($j_o$)". The CPU 30, 50 may also calculate an average agent capability ("aveCap ($j_o$)") by averaging the ACap(i,$j_o$) of the agents given an occupancy for work type $j_o$.

Once the initial target occupancy matrix is achieved, the CPU 30, 50 may begin to iteratively repair the matrix by reallocating agents (or portions of agents as required). As used herein, the term "iterative repair" means the creation of a plurality of alternative fractional agent reallocations and the selection and execution of one of the reallocations based upon some predetermined criteria. Iterative repair may be performed continuously to accommodate changes in call loading or periodically based upon some objective loading standard (e.g., queue length for call groups). Where iterative repair is performed periodically, the iterative process may begin and continue for a fixed number of iteration cycles specified by the user.

As a first step in the iterative repair process, the CPU 30, 50 may compute another service related parameter, called a matrix objective function value. The objective function value provides one means of evaluating a proposed new alternative agent reallocation over other proposed alternative agent reallocations. The value of the objective function may be determined as follows:

Value=(weightFTE)(scoreFTE)+(weightSkills)(scoreSkills), where "weightFTE" is a number indicating how important it is to allocate the right amount of staffing to each work type to match a predicted workload (a default value of weightFTE may be set equal to 1), where "weightSkills" is a number indicating how important it is to maximize the average of avecap(j) per work type (weighted by the agents' occupancy for that work type) (a default value of weightSkills may be set equal to 10), where $$scoreFTE = \sum_{j=1}^{numOfWorkTypes} (targetFTE(j) - assignedFTE(j))^2,$$

$$scoreSkills = \sum_{j=1}^{numOfWorkTypes} (aveCap(j) - bestCap(j))^2, \text{ and}$$

where "bestCap(j)" is the highest relative ACap(i,j) score for the work type j.

Once the objective function value is determined, agents are again selected sequentially one-by-one. For each selected agent, a first work type is selected randomly from a list of work types in which the agent already has an occupancy. A second work type is then selected at random and a portion of the agent's occupancy is transferred from the first work type to the second work type.

A revised target matrix is then created using the transferred occupancy. A new objective function value is determined from the revised target matrix. If the new objective function is smaller than the previous objective function, then the change in occupancy is made to the target matrix. If not, then the next agent is selected and the process is repeated.

In addition, before the change in occupancy is executed, the CPU 30, 50 performs the checks discussed above. For example, is the agent qualified to perform the work of the second work type?

In an alternative embodiment, the iterative repair may include selection of an overstaffed work type for which the agent has a non-zero occupancy value and selection of a second work type for which the agent is qualified. If the objective function is smaller, the change is implemented. Otherwise, the next agent is selected and the process is repeated.

The number of agents required for each work type (i.e., targetFTE(j)) for each work type j may be estimated from historical workload and Erlang tables, or from force management packages. For example, a prior history of call loading for a particular work type may be retrieved from an archive. The loading may be increased by some factor based upon most recent history to achieve an initial estimation of the number of agents required for each call type.

Iterative repair may be made periodically or only when required by call loading for a group. Specifically, an increase in a call arrival rate of a particular call type over the initial (or later) loading estimate may be used to trigger iterative repair.

The need for iterative repair may be determined by a number of methods. For example, the length of time a caller spends in a call queue is one measure of call loading. However, since callers would be expected to become discouraged and hang-up after a short time period, it is not the only measure available.

One other simple measure of call loading may be based upon the number of calls directed to the call type per time period. Using well known Erlang calculation techniques and an average time per call, this can be converted into a required number of full time agents.

Returning now to the system 10, as a whole, an explanation will be offered of the interaction between the MACD 18 and SACDs 20, 22. Following the explanation of the system 10, as a whole, a number of examples will also be offered.

To route the call to the selected agent after selection of the agent based upon Docc(j), the MACD 18 may first enter a lookup table 29 using a unique identifier of the selected agent. From the lookup table 29, the MACD 18 may retrieve an identifier of the SACD 20, 22.

Upon retrieving the identifier, the MACD 18 may prepare to transfer the call to the SACD 20, 22 of the selected agent. To transfer the call, a communication processor 45 within the MACD 18 may seize a control channel associated with the received call and transmit an identifier of the SACD 20, 22 to a call controller within the PSTN 16. The MACD 18 may also transfer a call control file 35 from the MACD 18 to the SACD 20, 22 over an interconnect 33.

The interconnect 33 may be any appropriate communication channel (e.g., leased line, private line, virtual private line, TCP/IP packet message through the Internet, etc.) linking the MACD 18 with the SACDs 20, 22. Alternatively, the interconnect may be a "D" channel of the PSTN 16 used as a channel for user data.

The call control file 35 may contain an identifier of the call, ANI information, DNIS, or any other information collected by the MACD 18. The call control file 35 may also contain the identifier of the selected agent at the SACD 20, 22. Alternatively, the identifier of the selected agent or agent cluster at the SACD 20, 22 could also be used.

As an alternative, the MACD 18 may send an identifier of the location of the call control file 35. Sending the identifier of the location may be used to reduce traffic where a call is moved among destinations because of overload or otherwise. The identifier of the location of the call control file 35 may include TCP/IP as well as file and directory information.

Once received, the SACD 20, 22 decodes the call control file 35 to retrieve the identifier of the selected agent and any other information available within the call control file 35. When the call arrives through the PSTN 16, the SACD 20, 22 matches the call identifier in the call control file 35 with the call and transfers the call to a telephone 56, 60, 64, 68 of the selected agent or an agent in the selected agent cluster.

If the call control file 35 contains a customer identifier (e.g., based upon ANI), then the SACD 20, 22 may retrieve customer information. Any retrieved customer information may be displayed on a terminal 58, 62, 66, 70 of the selected agent simultaneously with call delivery.

Under another illustrated embodiment of the invention, the MACD 18 caches a copy of the combined target and actual occupancy matrices at each SACD 20, 22. The MACD 18 may then update this cache periodically in a background mode for purposes discussed below.

The decision to send a call from the MACD 18 to a selected SACD 20, 22 may be based upon the likelihood that the selected SACD 20, 22 is the best choice, based on the current target and actual occupancies and how dynamic the changes in the occupancies are expected to be. As used herein, the term "dynamic" refers to a rate of change in an actual occupancy.

For example, in the case shown in Tables I and II, agents #1 and #2 may be located at a first SACD 20 and agents #3 and #4 may be located at a second SACD 22. If the MACD 18 should receive a call which it determines to be of the second work type, then it could transfer the call to either SACD 20, 22 since either SACD has agents with an occupancy in the second work type.

If the system dynamic with regard to call type #2 were determined to be low, then the MACD 18 may assign the call to agent #1 at the first SACD 20. The MACD 18 may assign the call to agent #1 because agent #1 has the greatest relative under-utilization or least over-utilization with regard to the target and actual occupancy matrices for call type #2.

On the other hand, if the system dynamic with regard to call type #2 were determined to be relatively high then the MACD 18 may assign the call to agent #3 at the second SACD 22. The MACD 18 may assign the call to agent #3 because even though agent #3 doesn't have the largest relative difference between the target and actual occupancy matrices for call type #2, there is another agent (i.e., agent #4) that could take the call if agent #3 were to become unavailable before the call arrived. Another way of viewing this situation is that the MACD 18 assigns the call based upon the largest average difference between the target and actual occupancies of the respective SACDs 20, 22 or the number of agents that would benefit from taking the call.

Moreover, if the MACD 18 did route the call to the second SACD 22, then the MACD 18 may make an initial assignment of the call to agent #3. If agent #3 is busy by the time the call arrives, then the CPU 50 at the second SACD 22 must make a determination of what to do with the call.

As a first step, the CPU 50 at the second SACD 22 may perform a comparison between the local target and actual occupancy matrix of the second SACD 22 to identify an agent with a largest relative difference for call type #2. Upon making the comparison, the CPU 50 may determine that agent #4 has the greatest difference and may then assign and route the call to agent #4.

If agent #4 were also to become busy before the call arrives, then further processing may be required. For example, in the understaffed situation, the CPU 50 of the second SACD 22 may determine that from a queue length for each call type, that an excessive time period may elapse before the transferred call could be answered. In this case, the CPU 50 of the second SACD 22 may send a message to the MACD 18 asking that the call be queued at multiple ACDs 20, 22. The message may include a copy of the call control file 35 as well as indication that the call should be queued at another ACDs 20.

Upon receiving the request for multiple queuing, the MACD 18 may also send the call control file 35 to the first SACD 20. In response, the first and second SACDs 20, 22 may both queue the call pending agent availability. If the first agent to become available is at the first SACD 20, then the second SACD 22 transfers the call to the first SACD 20. Otherwise, the call may be answered at the second SACD 22, as originally intended.

As a further alternative, the queue length at the second SACD 22 may be such as to require that the call be re-routed immediately. In this case, the CPU 50 located at the second SACD 22 (if configured to operate as a PACD) may function in a manner similar to the MACD 18 by comparing a combined target occupancy matrix with a combined actual occupancy matrix in cache memory to identify an agent at another ACD site. Once another agent is identified, the second SACD 22 may transfer (overflow) the call along with a call control file to the new ACD.

It should be noted, that in some circumstances, the SACDs 20, 22 would function as a PACD based upon the circumstances of the call. For example, if the SACDs 20, 22 are geographically diverse from any MACD 18, then it would only make sense that the SACD 20, 22 would route the call from that location rather than transferring the call back to the MACD 18.

Further, the SACDs 20, 22 may function as PACDs in other circumstances other than local calls or no agents available at the receiving site. For example, if a system overload (or malfunction) at the MACD 18 should render the MACD 18 unavailable, then the SACD 20, 22 would function automatically as a PACD to route the call to an appropriate agent.

Under still another embodiment, a website 37 may be provided within an associated host 30 of the MACD 18 for routing Internet telephony (voice-over-IP or VoIP) calls. An IP address of a customer 12, 14 may be retrieved from a website request received at the website 37 from the customer 12, 14. A call type may be determined from the webpage visited by the customer 12, 14. Selection of an agent may be made as described above by comparing a target occupancy with an actual occupancy for the call type.

Call transfer of a VoIP call may be accomplished by the CPU 30 transferring the IP address of the customer 12, 14 to a terminal 58, 62, 66, 70 through a CPU 50 of the SACD 20, 22. The downloading of the IP address along with the request for an VoIP call may cause the terminal of the selected agent to automatically set up a VoIP connection between the selected agent and customer 12, 14.

A specific embodiment of a method and apparatus for an improved multi-site skill-based call routing system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of distributing calls in an automatic call distribution system having a master site, a plurality of satellite sites and at least some agents located at each satellite site of the plurality of satellite sites, such method comprising the steps of:

detecting a call at the master site of the automatic call distribution system;

determining a call type of the call;

contemporaneously measuring a deviation from a target occupancy in handling calls of the determined call type for each agent of the at least some agents located at each satellite site;

identifying an agent with a smallest relative over-utilization or largest relative under-utilization based upon the measured deviation; and transferring the call from the master site to a satellite site of the plurality of satellite site where the identified agent is located.

2. The method of distributing calls as in claim 1 further comprising assigning the call to the identified agent at the satellite site where the agent is located.

3. The method of distributing calls as in claim 1 further comprising assigning the call to a different agent at the satellite site where the identified agent is located.

4. The method of distributing calls as in claim 1 further comprising requesting that the master site simultaneously queue the call at a plurality of satellite sites.

5. The method of distributing calls as in claim 1 further comprising overflowing the call from the satellite site where the agent was located to another satellite site.

6. The method of distributing calls as in claim 1 wherein the step of transferring the call to the satellite site where the agent is located further comprises transferring a call control file of the call to the satellite site.

7. The method of distributing calls as in claim 1 further wherein the step of determining a call type further comprises receiving call associated information from an associated public switched telephone network.

8. The method of distributing calls as in claim 1 further comprising subtracting the actual occupancy from the target occupancy of each agent to determine the relative difference for the agent.

9. The method of distributing calls as in claim 1 further comprising periodically transferring the actual occupancy and the target occupancy from a satellite site to the master site.

10. The method of distributing calls as in claim 9 further comprising forming the target occupancy and actual occupancy at each satellite site of the plurality of satellite sites.

11. The method of distributing calls as in claim 9 further comprising transferring the call to another satellite site where the satellite is unable to process the call locally.

12. An apparatus for distributing calls in an automatic call distribution system having a master site, a plurality of satellite sites and at least some agents located at each satellite site of the plurality of satellite sites, such apparatus comprising:
   means for detecting a call at the master site of the automatic call distribution system;
   means for determining a call type of the call;
   means for contemporaneously measuring a deviation from a target occupancy in handling calls of the determined call type for each agent of the at least some agents located at each satellite site;
   means for identifying an agent that is most under-utilized or least over-utilized with respect to the measured deviation; and
   means for transferring the call from the master site to a satellite site of the plurality of satellite site where the identified agent is located.

13. The apparatus for distributing calls as in claim 12 further comprising means for assigning the call to the identified agent at the satellite site where the agent is located.

14. The apparatus for distributing calls as in claim 12 further comprising means for assigning the call to a different agent at the satellite site where the identified agent is located.

15. The apparatus for distributing calls as in claim 12 further comprising means for requesting that the master site simultaneously queue the call at a plurality of satellite sites.

16. The apparatus for distributing calls as in claim 12 further comprising means for overflowing the call from the satellite site where the agent was located to another satellite site.

17. The apparatus for distributing calls as in claim 12 wherein the means for transferring the call to the satellite site where the agent is located further comprises means for transferring a call control file of the call to the satellite site.

18. The apparatus for distributing calls as in claim 12 further wherein the means for determining a call type further comprises means for receiving call associated information from an associated public switched telephone network.

19. The apparatus for distributing calls as in claim 12 further comprising means for subtracting the actual occupancy from the target occupancy of each agent to determine the relative difference for the agent.

20. The apparatus for distributing calls as in claim 12 further comprising means for periodically transferring the actual occupancy and the target occupancy from a satellite site to the master site.

21. The apparatus for distributing calls as in claim 20 further comprising means for forming the target occupancy and actual occupancy at each satellite site of the plurality of satellite sites.

22. An apparatus for distributing calls in an automatic call distribution system having a master site, a plurality of satellite sites and at least some agents located at each satellite site of the plurality of satellite sites, such apparatus comprising:
   a communication processor adapted to detecting a call at the master site of the automatic call distribution system;
   a call analyzer adapted to determine a call type of the call;
   an arithmetic unit adapted to contemporaneously measure a deviation from a target occupancy in handling calls of the determined call type for each agent of the at least some agents located at each satellite site;
   a comparator adapted to identify an agent that is most under-utilized or least over-utilized with respect to the measured deviation; and
   a communication processor adapted to transferring the call from the master site to a satellite site of the plurality of satellite site where the identified agent is located.

23. The apparatus for distributing calls as in claim 22 further comprising a processor adapted to assign the call to the identified agent at the satellite site where the agent is located.

24. A method of distributing calls in an automatic call distribution system, such method comprising the steps of:
   detecting a call at a master site of the automatic call distribution system;
   determining a call type of the call;
   retrieving a target occupancy and an actual occupancy for the determined call type for each of a plurality of agents located at each of a plurality of satellite sites;
   assigning the call to an agent that is most under-utilized or least over-utilized with respect to the difference between the target occupancy and actual occupancy; and
   transferring the call to a satellite site of the plurality of satellite sites where the agent is located.

* * * * *